United States Patent [19]
Lessing et al.

[11] Patent Number: 5,641,585
[45] Date of Patent: Jun. 24, 1997

[54] MINIATURE CERAMIC FUEL CELL

[75] Inventors: Paul A. Lessing; Anthony C. Zuppero, both of Idaho Falls, Id.

[73] Assignee: Lockheed Idaho Technologies Company, Idaho Falls, Id.

[21] Appl. No.: 408,761

[22] Filed: Mar. 21, 1995

[51] Int. Cl.$^6$ .................................................. H10M 8/04
[52] U.S. Cl. ................................ 429/26; 429/20; 429/34
[58] Field of Search ................................ 429/26, 24, 34, 429/20, 13

[56] References Cited

U.S. PATENT DOCUMENTS

| | | | |
|---|---|---|---|
| 4,650,727 | 3/1987 | Vanderburgh et al. | 429/26 X |
| 5,342,703 | 8/1994 | Kawasaki et al. | 429/30 |
| 5,364,711 | 11/1994 | Yamada et al. | 429/15 |
| 5,470,670 | 11/1995 | Yasumoto et al. | 429/26 X |

OTHER PUBLICATIONS

*International Solar Energy Intelligence Report*, Jul. 11, 1994.
*Mechanical Engineering–CIME*, Sep. 1994.
"Developing New Miniature Energy Systems" *Mechanical Engineering–CIME*, vol. 116, No. 9, p. 82 (1994 Sep.).

*Primary Examiner*—John S. Maples
*Attorney, Agent, or Firm*—Thorpe North & Western

[57] ABSTRACT

A miniature power source assembly capable of providing portable electricity is provided. A preferred embodiment of the power source assembly employing a fuel tank, fuel pump and control, air pump, heat management system, power chamber, power conditioning and power storage. The power chamber utilizes a ceramic fuel cell to produce the electricity. Incoming hydro carbon fuel is automatically reformed within the power chamber. Electrochemical combustion of hydrogen then produces electricity.

52 Claims, 11 Drawing Sheets

MINIATURE CERAMIC FUEL CELL

CONTRACTUAL ORIGIN OF THE INVENTION

The United States Government has rights in this invention disclosed under contract number DE-AC07-94ID13223 with Lockheed Idaho Technologies Company.

BACKGROUND

1. Field of the Invention

This invention relates generally to fuel cells for providing portable electricity. More specifically, this invention relates to miniature solid oxide fuel cells which are employed to provide power, typically in the form of direct current electricity, to portable devices such as cellular phones, notebook computer, and medical devices.

2. Background Art

A commonly employed method for providing electricity to portable devices is to utilize a battery or batteries. Batteries are used in a range of devices from flashlights to cellular phones. Batteries may be single use or rechargeable. Problems such as discharge have led to attempts to develop replaceable power sources which would utilize a fuel to create electricity.

Single use batteries are probably the most commonly used battery today. Single use batteries employ a dry cell or series of dry cells. Typically each cell produces 1.5 volts. The cells are connected in series to achieve the desired voltage. The associated current, and thus the total electrical energy available, is dependent on the size of the cell.

A typical dry cell well known in the art would employ a zinc coated metal container which would enclose all of the chemical ingredients and which would also serve as the negative electrode. The positive electrode would consist of a carbon rod. A paste of ammonium chloride, zinc chloride, and water would serve as the electrolyte.

The positive terminal or anode of such a cell would be surrounded with a thin layer of powdered carbon and manganese dioxide. When a load is place across the anode and the negative terminal or cathode, ammonium ions gain electrons at the carbon rod and zinc ions are formed at the cathode. This process results in the formation of ammonia gas and hydrogen.

A chemical reaction takes place between the ammonia gas and the zinc chloride. Additionally, the hydrogen and the manganese dioxide chemically react. These reactions result in the output of electricity.

Eventually, the chemical components necessary to produce electricity are depleted and the cell is no longer usable. A battery comprised of dry cells is discarded at this point.

Another type of battery utilizes what are often referred to as wet cells. Lead acid batteries are well known in the art and fit into this general category. In this type of battery, it is possible to reinitialize or recharge the battery upon discharge.

Some rechargeable batteries also exhibit another undesirable characteristic known as memory. Memory is a term used to describe the effect seen when a rechargeable battery is charged prior to becoming fully discharged. Batteries susceptible to this effect will remember to what level they had discharged and will only provide power to that level, even though power should be available below that level. This effect can cause a battery which should have a life of several hours to be reduced to an effective life of less than an hour per recharge. This is a highly undesirable effect which can severely curtail the usefulness of a rechargeable battery.

The disadvantage of discharge is exhibited by batteries using both dry cells and wet cells. Although some progress has been made in terms of battery life, charging time, and shelf life, nevertheless most batteries will eventually be discarded. Single use batteries are discarded when they become discharged. Rechargeable batteries have an advantage over disposable batteries in that they can be recharged and used again. The number of times a rechargeable battery may be discharged and recharged is typically limited, however, and eventually even rechargeable batteries will require disposal.

The disadvantages and limitation of supplying power via batteries, particularly with regard to large applications has lead to attempts to develop alternative portable power supplies. One such alternative is the ceramic fuel cell. Ceramic fuel cells utilize an electrochemical combustion of hydrogen to produce direct current electricity. The hydrogen is typically derived from a hydrocarbon fuel, alcohol, or coal. Ceramic fuel cells are also commonly known as solid oxide fuel cells due to the predominant use of oxides as the electrolyte.

Solid oxide fuel cells have enjoyed some success, however they are also possessed of a number of characteristics which make them unsuitable to provide portable power to devices such as cellular phones, notebook computers, and medical instruments. For example, prior art solid oxide fuel cells are typically large and somewhat cumbersome. The large size of the typical prior art solid oxide fuel cell does not lend itself to use in small devices.

In addition, the high operating temperatures at which solid oxide fuel cells operate make them seemingly unsuitable for incorporation in hand held devices. Further, the time interval required for a solid oxide fuel cell to begin producing direct current electricity is on the order of hours. Clearly such a lengthy start up time is annoying at best in use with devices designed for convenience such as cellular phones and notebook computers. Further, such a lengthy start up time prohibits the use of solid oxide cells in medical devices which may be instantly required for use in medical emergencies.

It would, therefore, be an advantage in the art to provide a ceramic fuel cell which would be adapted for incorporation in small, often hand held, portable devices and, accordingly, which would exhibit the characteristics of quick start up and heat management.

BRIEF SUMMARY AND OBJECTS OF THE INVENTION

The present invention is a system for providing power for portable devices which require a small, direct current electricity power supply such as cellular phones, notebook computers, and medical devices, by incorporating a ceramic fuel cell. The power supply system of a preferred embodiment of the present invention typically employs a fuel tank, a fuel pump, an air pump, a start up device, a power chamber, a heat management system, a power conditioner, and a power storage device.

The start up device, typically a heating element, allows the ceramic fuel cell of the power chamber to quickly begin full scale operation. The power chamber incorporates a catalyst for automatically reforming a hydrocarbon based fuel to provide the hydrogen necessary to produce the electrolyte, via an electrochemical reaction, for the ceramic fuel cell. Surrounding the power chamber is a superinsulator which insulates the power chamber, typically operating in the 1000 degrees Celsius range, from the portable device in which the inventive power supply system is incorporated thereby preventing damage to other components of the portable device. The superinsulator and heat management system also serve to prevent heat or heated exhaust from coming in contact with the user and causing injury.

Accordingly, it is a primary object of the present invention to provide a source of direct current electricity which is not subject to discharge and is designed for use in devices requiring small portable sources of direct current electricity such as cellular phones, notebook computers, medical equipment, and the like.

It is a further object of the present invention to provide a source of direct current electricity which will begin providing power within a relatively small amount of time after operation is initiated.

A still further object of the present invention is to provide a source of direct current electricity which utilizes a replenishable, commonly available, fuel supply.

An additional object of the present invention is to provide a system which incorporates heat management such that the high operating temperatures of the ceramic fuel cell do not result in damage to the portable device or injury to the user.

These and other objects of the present invention will become more fully apparent from the following description and appended claims or may be learned by the practice of the invention as set forth herein.

BRIEF DESCRIPTION OF THE DRAWINGS

In order to more fully understand the manner in which the above-recited and other advantages and objects of the present invention are obtained, a more particular description of the invention briefly described above will be rendered by reference to the presently understood best mode for making and using the same, as illustrated in the appended drawings. Understanding the these drawings depict only typical embodiments of the invention and are, therefore, not to be considered as limiting of its scope, the invention will be described with additional specificity and detail through the use of the accompanying drawings in which:

FIG. 18A represents the application of the pulsed laser beam.

FIG. 18B depicts the vapor blow off which occurs.

FIG. 18C illustrates the devise layer of $ZrO_2$ achieved.

DETAILED DESCRIPTION OF THE INVENTION

Figure 1:
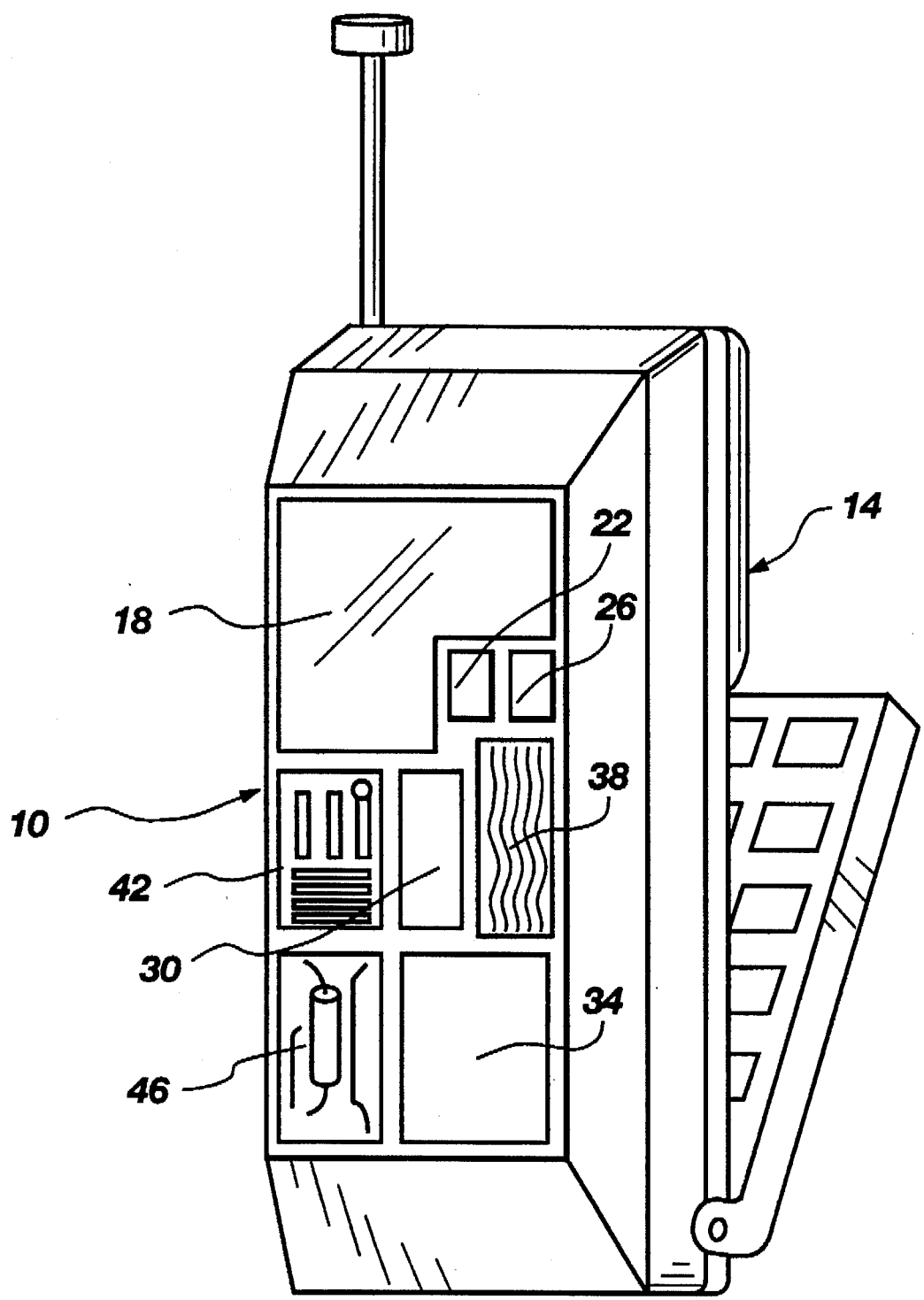
FIG. 1 depicts the presently preferred embodiment of the inventive power supply system as it might appear when incorporated in a cellular phone.

Reference is now made to the embodiments and methods illustrated in FIGS. 1 through 18 wherein like numerals are used to designate like parts throughout. In FIG. 1 illustrates the power supply system of the present invention, designated generally as 10, as it might appear in use with a cellular phone 14. The housing surrounding power supply system 10 is depicted as being open so as to reveal the components therein, although in actual use the housing of cellular phone 14 would completely enclose the components of power supply.

As illustrated, a presently preferred embodiment of the power supply system of the present invention incorporates a fuel tank 18, a fuel pump 22, an air pump 26, a start up device 30, a power chamber 34, a heat management system 38, a power conditioner 42, and power storage 46. Various embodiments of power chamber 34 are further illustrated in FIGS. 3 through 6 and 9.

As will be appreciated these components could be arranged in differing ways to adapt to the existing configuration of the power pack of a variety of devices such as notebook computers, medical devices, and other devices requiring portable sources of power. Thus, the arrangement of the components is not critical to the operation of the present inventive power supply system.

In use fuel, from fuel tank 18, and air would be pumped, by fuel pump 22 and air pump 26 respectively, into power chamber 34. Typically hydrocarbon fuels would be utilized. Start up device 30 would allow the power producing process taking place within power chamber 34 to begin.

Specifically, fuel entering power chamber 34 would be reformed to produce hydrogen. Within power chamber 34 would be the electrochemical combustion of the hydrogen allows for the production of direct current electricity. The direct current electricity would then be conditioned, if required, by power conditioner 42. The electricity would then be routed to power storage device 46 where it would be available for use.

Figure 2:
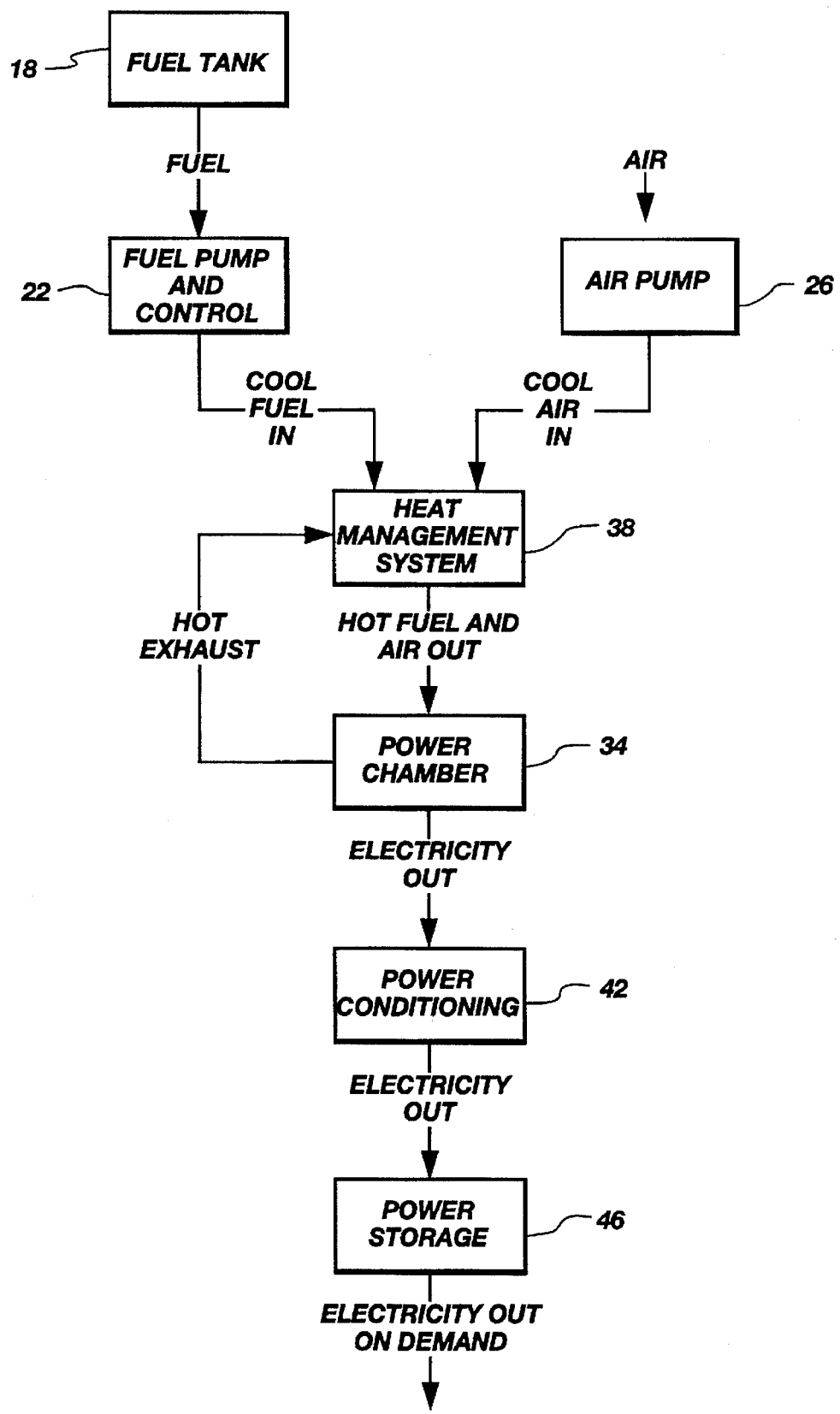
FIG. 2 depicts a preferred embodiment of the present invention in block diagram form.

FIG. 2 better illustrates this process in a flow chart or functional block diagram form. As shown, fuel is supplied to fuel pump 22 from fuel tank 18. Fuel pump 22 delivers cool fuel to heat management system 38. Simultaneously, air is delivered by air pump 26 to heat management system 38. The air and fuel are heated in heat management system 38 prior to being delivered to power chamber 34. The exhaust from power chamber 34 is routed back to heat management system 38 so as to aid the system in maintaining the heat necessary for operation and to allow exhaust gases to be adequately cooled before being allowed to vent to surrounding areas. Proper heat management and adequate cooling of exhaust gases is required to allow operation of the system without damage to the portable device in which it is incorporated or injury to users of the device.

Electricity from power chamber 34 is routed to power conditioning 42 so that the power being produced can be conditioned, if necessary, so as to be usable by the portable device it is incorporated into. The power is then routed to power storage 46. Power storage 46 stores power for use on demand.

Figure 3:
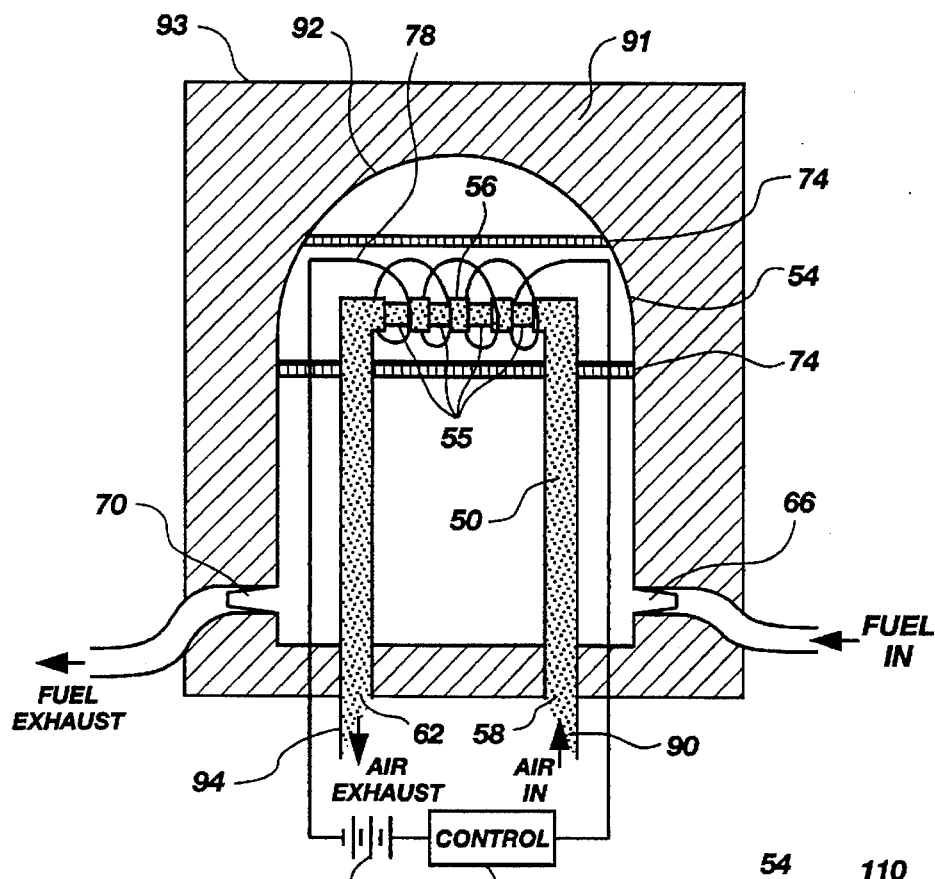
FIG. 3 depicts a presently preferred embodiment of the inventive miniature cross sectional view of a fuel cell wherein air is circulated through a u-shaped conduit housed within a fuel filled container.

In FIG. 3, a currently preferred embodiment of power chamber 34 of the present invention is illustrated. In operation power chamber 34 provides for the reformation of an input fuel to provide hydrogen. The electrochemical combustion of this hydrogen supplies the electrolyte needed thus producing direct current electricity to power cellular phones, computers, medical equipment or other device requiring a small portable power source.

As indicated, air flows in and out of u-shaped conduit 50 which is housed in container 54. Container 54 is preferably constructed of a metallic material and is on the order of 1 cm high by 1 cm wide. Container 54 is thus much smaller than devices previously employed.

The preferred diameter of u-shaped conduit 50 is 1 to 2 millimeters. U-shaped conduit provides a single duct which allows for simplicity of manifolding. Only one connection need be made to u-shaped conduit input port 58 and likewise to u-shaped conduit output port 62.

Figure 7:
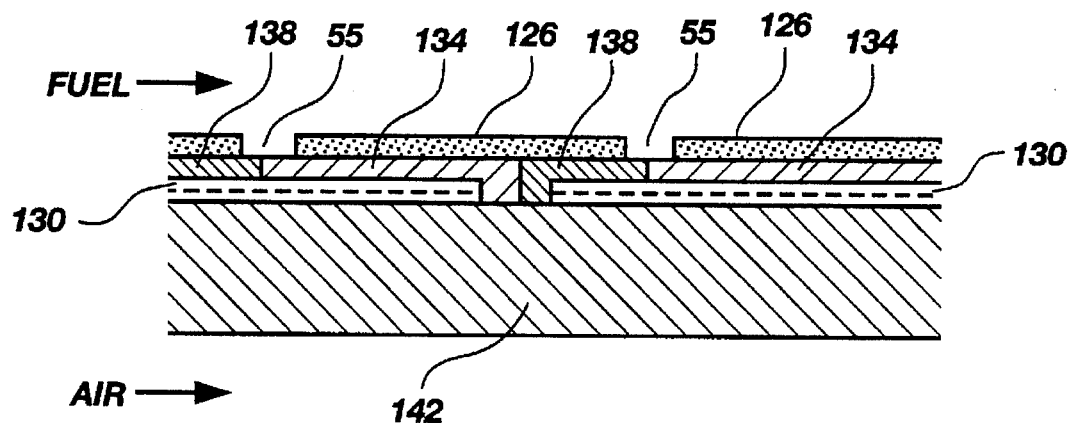
FIG. 7 depicts a cross sectional view of the detail of the tubular fuel cells disposed on the u-shaped conduit of FIG. 3 and the straight conduit of FIG. 4.
Figure 8:
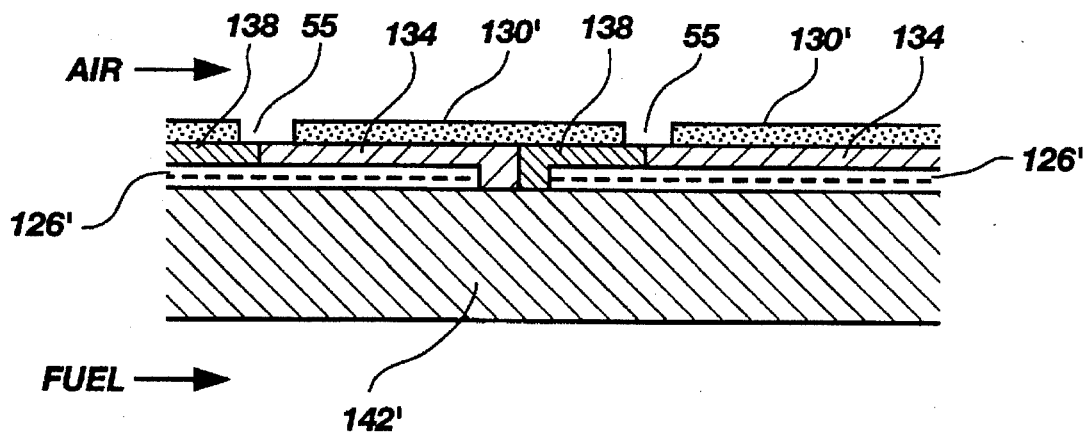
FIG. 8 depicts a cross sectional view of the detail of the tubular fuel cells disposed on the u-shaped conduit of FIG. 5 and the straight conduit of FIG. 6.

Notches 55 represent power cells which are discussed in detail in relation to FIGS. 7 and 8. The power cells are placed along cross member 56 of u-shaped conduit 50. The number of power cells is dependent on the desired voltage.

Air flows into u-shaped conduit 50 at u-shaped conduit input port 58 and exhaust air flows out of u-shaped conduit 50 at u shaped conduit output port 62. Simultaneously, fuel flows into container 54 at container input port 66 and fuel exhaust flows out at container output port 70. The preferred fuel will be a hydrocarbon fuel such as butane, propane, or similar hydrocarbon fuels.

The utilization of container 54 allows for a number of advantages. For example, once operation of power chamber 34 is begun, a partial vacuum may be drawn on container 54. This can assist in sustaining the heat and other conditions necessary for continued operation of power chamber 34 with little or no external inputs. Container 54 can act in many respects as a thermos bottle, containing the heat of the electrochemical reaction. It should be noted, however, that the system will eventually deplete its supply of oxygen if remaining in the partial vacuum state. Fuel flowing through container 54 is automatically reformed within container 54 due to the presence of porous tube 74. Porous tube 74 contains Nickel, Aluminum, and ceramic. This combination acts to reform the incoming hydrocarbon fuel thus providing a supply of hydrogen which is then electrochemically combusted to produce the desired electricity. Porous tube 74 also acts as a radiation shield. In addition, porous tube 74 includes a reflection coating 75 which reflects heat back in on the reaction.

Resistance heating element 78 provides heat to begin and, if necessary sustain, the electrochemical reaction. Reflective coating of porous tube 74 reflects the energy of resistance heating element 78 thus maximizing the input power. Resistance heating element 78 is supplied with power via power source 82. Resistance heating element control 86 acts to turn resistance heating element 78 on and off as required and also acts to insure that power source 82 remains charged. Preferably, resistance heating element 78 will be constructed of Nichrome (NiCr) or Tungsten (W).

As will be appreciated, the electrochemical combustion of hydrogen occurs at a high temperature. Without outside input, the level of reaction required to produce electricity in usable quantity can take hours to reach. With the addition of resistance heating element 78, this turn on time can be substantially reduced or effectively eliminated.

As will be further appreciated, the cellular phone, notebook computer, or other portable device into which the present invention is incorporated must be protected from the high temperatures, on the order of 1000 C, involved. In addition, the users of the devices must be protected from injury which could result from coming in contact with such high temperatures. Super insulator 91 is designed to allow the internal surface 92 temperature to be extremely high while maintaining the outside surface 93 temperature to be touchable without injury. To achieve this, super insulator 91 is constructed of a fibrous ceramic material such as space shuttle tile.

Negative power lead 90 and positive power lead 94 allow for power to be drawn off from the system and routed to power conditioning, if necessary and then on to power storage. Electricity is then available on demand to the cellular phone, notebook computer, or other portable device. Power available at negative power lead 90 and positive power lead 94 can also be routed to power source 82 by control 86 as necessary.

Figure 4:
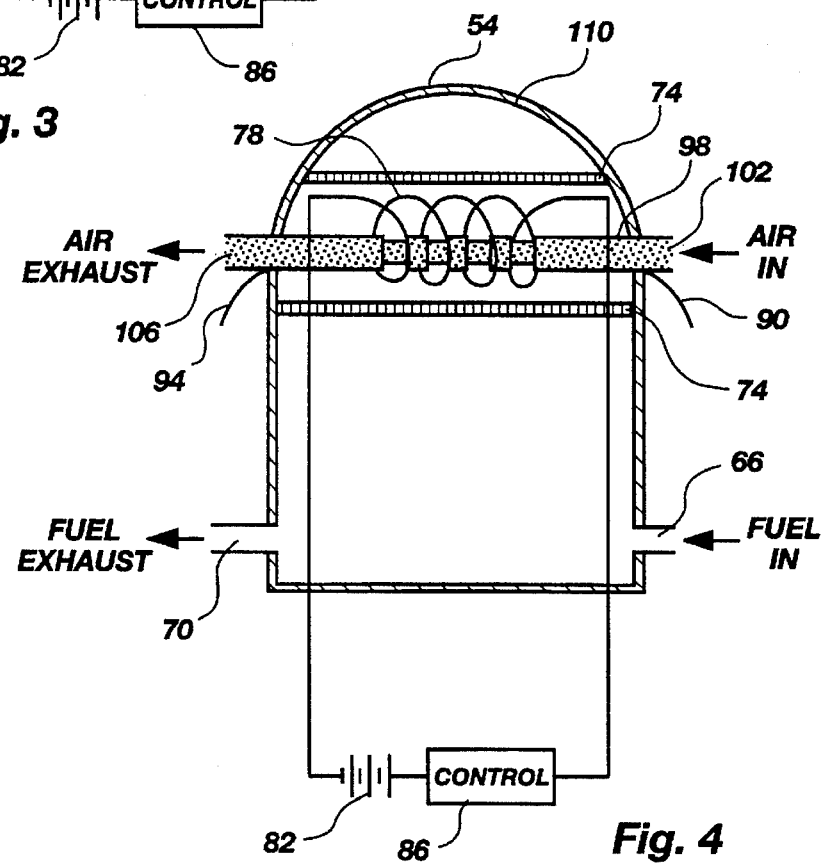
FIG. 4 depicts a cross sectional view of another presently preferred embodiment of the inventive miniature fuel cell wherein air is circulated through a straight conduit housed with a fuel filled container.

FIG. 4 illustrates another embodiment of the present invention. This embodiment is similar to the embodiment of FIG. 3 in that air flows in the conduit and fuel flows in the container. In this embodiment, a straight tube 98 is employed. Air enters straight tube 98 at straight tube input port 102 and air exhausts out straight tube output port 106.

Also depicted in this embodiment is an interior reflective coating 110. Interior reflective coating 110 is applied to the interior surface of container 54 and is designed to act as a heat shield.

Figure 5:
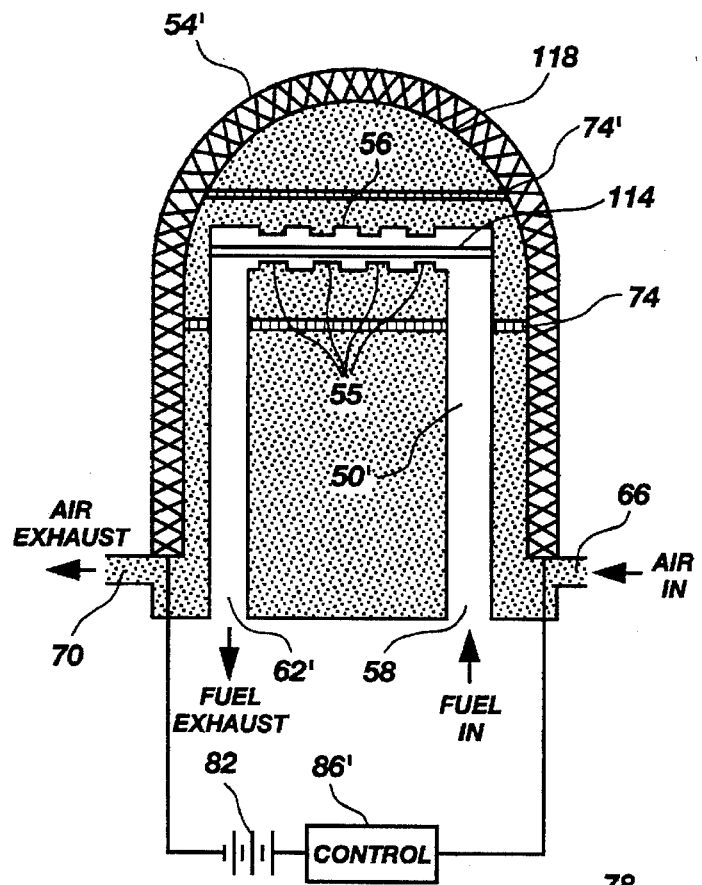
FIG. 5 depicts yet another cross sectional view of an embodiment of the inventive miniature fuel cell wherein fuel is circulated through a u-shaped conduit housed within a container filled with air.
Figure 6:
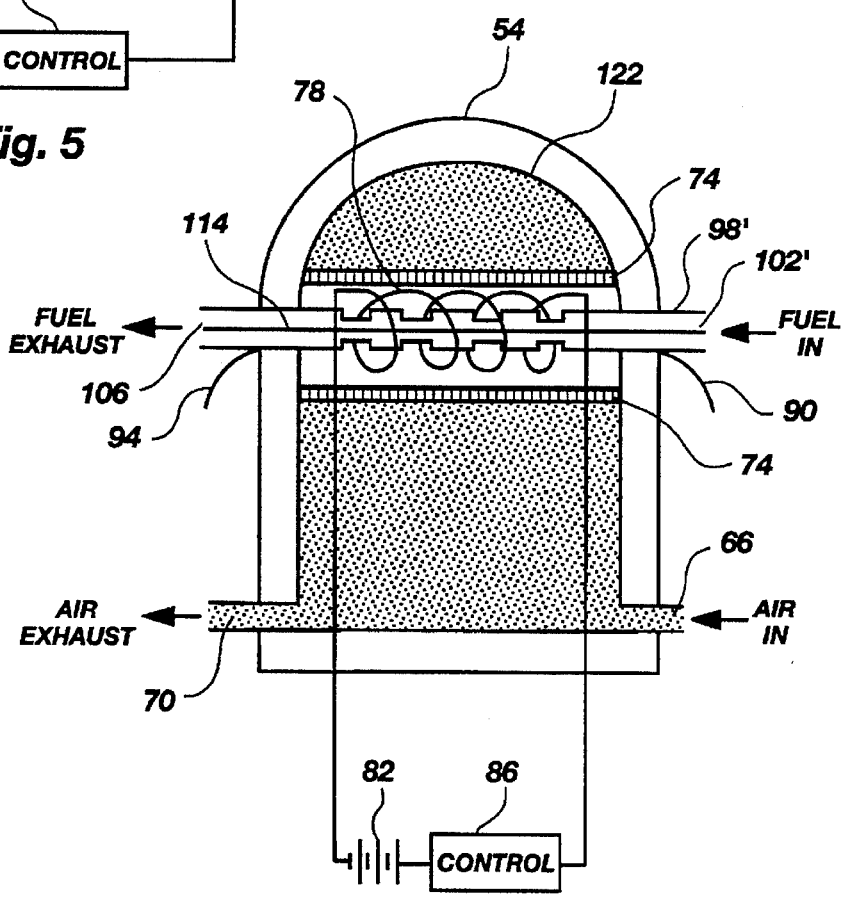
FIG. 6 depicts another cross sectional view of an embodiment of the inventive fuel cell wherein fuel is circulated through a straight conduit housed within a container filled with air.

Turning to FIGS. 5 and 6 embodiments wherein fuel flows through u-shaped conduit 50' and straight conduit 98' are illustrated. In these embodiments air flows through container 54.

Specifically, FIG. 5 illustrates an embodiment in which fuel flows into u-shaped conduit 50' through u-shaped conduit input port 58. Fuel exhaust flows out of u-shaped conduit 50' at u-shaped conduit output port 62. Simultaneously, air enters container 54 through container input port 66 and air exhaust exist the system through container output port 70.

U-shaped conduit 50' contains catalyst element 114. Catalyst element 114 is constructed of Nickel, Aluminum, and ceramic material so as to provide for reformation of incoming fuel within u-shaped conduit 50' Reformation of the hydrocarbon fuel is required to provide the hydrogen necessary for the electrochemical reaction which produces the desired electricity.

In this embodiment porous tube 74' need not be made of Nickel, Aluminum, and ceramic but may employ any substance which will provide adequate radiation shielding. Typically porous tube 74' will be constructed of a thin ceramic material.

This embodiment also employs a starter system other than a NiCr or W wire resistance heating element. Here an electrical burner 118, similar to burners used in electric ranges, is employed. Heat is radiated from electrical burner 118 as needed to start and sustain the electrochemical reaction. Power source 82' supplies power to electrical burner 118 when in use. Controls 86' turn electrical burner 118 on and off as needed and insure that power source 82' is recharged when required.

Finally, container 54' is preferably constructed of an oxidation resistant material. Oxidation resistant metal alloys or ceramics are acceptable materials for the manufacture of container 54'.

Turning to FIG. 6, an embodiment using straight conduit 98' is employed. Fuel flows through straight conduit 98' and is reformed due to the presence of catalyst element 114. The resulting hydrogen supplies the electrochemical reaction which produces the desired electricity.

Also depicted in this embodiment is a double walled configuration of container 54. Interior wall 122 serves to provide additional heat shielding and to aid in maintaining the temperatures necessary for the electrochemical combustion of hydrogen.

FIG. 7 shows the details of the cells placed along u-shaped conduit 50 of FIG. 3 and straight conduit 98 of FIG. 4. In the embodiments of FIGS. 3 and 4, air flows along the inside of the conduits while fuel flows along the outside. As illustrated in FIG. 7, the cells placed along the conduits utilize anode 126, cathode 130, electrolyte 134, and interconnect 138 placed along a porous support member 142.

Anode 126 is preferably manufactured of a substance containing Nickel, Aluminum, and ceramic. Cathode 130 is preferably manufactured of LaSrMnO$_3$ as is porous support member 142. Electrolyte 134 may be ZrO$_2$, C$_2$O$_2$, or similar material. Interconnect 138 is constructed of LaSrCrO$_3$ or similar material.

Turning to FIG. 8, the details of the cells placed along u-shaped conduit 50' of FIG. 5 and straight conduit 98' of FIG. 6 are illustrated. In the embodiments of FIGS. 5 and 6, fuel flows along the inside of the conduits while air flows along the outside. As illustrated 22 in FIG. 8, the cells placed along the conduits utilize a different configuration of anode and cathode to accommodate the difference in the air and fuel flow. As shown anode 126' and cathode 130' and placed differently although electrolyte 134 and interconnect 138 remain the same. Anode 126 and cathode 130 are, however, made of the same materials as used in the embodiment of FIG. 7.

Each element is placed along a porous support member 142' which maintains the same placement as support member 142 of FIG. 7 but here support member 142' is constructed of different materials. Specifically, support member 142' is made of a composition of Nickel, Aluminum, and ceramic. This combination allows for the automatic reformation of the hydrocarbon fuel into the hydrogen necessary for the electrochemical reaction.

When a cell is operating, a continuous stream of reformed fuel (hydrogen and carbon monoxide) and air are supplied to the anode and cathode respectively. Oxygen from the air is consumed by the cathode and is conveyed via the electrolyte (in the form of negatively charged oxygen ions) to the anode. There, the oxygen combines with hydrogen to produce water and with carbon monoxide to produce carbon dioxide. This flow of oxygen ions results in an accumulation of both negative charge at the anode and positive charge at the cathode. This flow of charge constitutes DC current and can be used to power devices such as cellular phones, notebook computers, computers, and other portable devices. Oxygen ions will flow only when the difference in electric potential between anode and the cathode is less than a certain voltage (about 0.7 to 1.0 Volt); this serves to regulate the voltage of each cell.

The number of cells utilized in a given application is dependent on the voltage desired. Each cell produces in the range of 0.7 volts to 1 volt. Cells are added by linking, via interconnect 138, until the voltage required for the cellular phone, notebook computer, or other portable device is attained.

Figure 9:
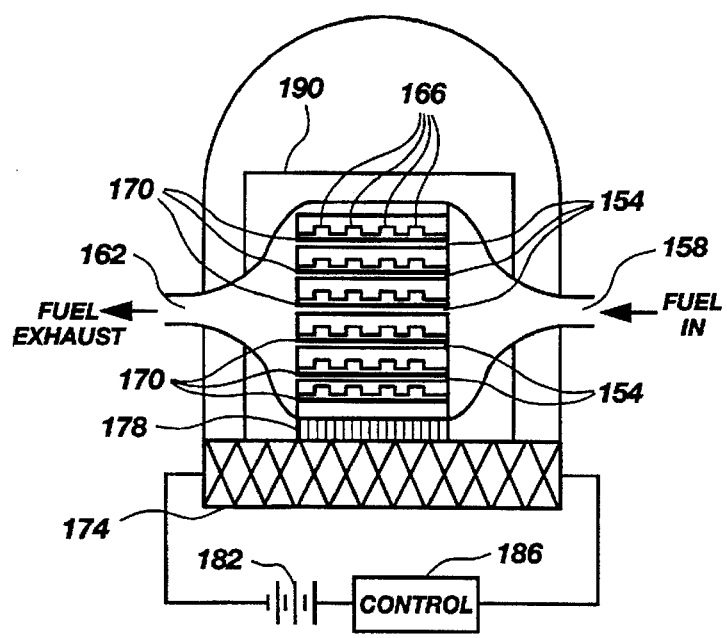
FIG. 9 depicts a cross sectional view of an embodiment of the fuel cell system which incorporates planar fuel cells

Turning to FIG. 9 an alternate embodiment of the current system is depicted. In this embodiment cells having a planar geometry are employed. Plates having a plurality of passageways therethrough are employed. The plates are constructed so that the passageways for fuel and passageways for air are perpendicular to each other on opposite sides of the plates.

The passageways allow for the passage of air and fuel necessary for the electrochemical reaction to occur. In the embodiment illustrated in FIG. 9, fuel enters the fuel passageways 154 through input port 158 while exhaust exits the system through output port 162. Simultaneously, air flows through air passageways 166. Cells are joined together via planar interconnects 170.

The planar cells are connected to a plane burner 174 via a physical connection 178. Cement, braze, ceramic or other material or method may be employed to physically connect the planar cells to plane burner 174. Plane burner 174 provides the initial energy necessary to start up the system. Power to plane burner 174 is provided by burner power supply 182. Burner control 186 turns plane burner 174 on and off as required to start or maintain the electrochemical reaction. Burner controls 186 also insure that burner power supply 182 stays charged by drawing current off of negative power lead 90 and positive power lead 94 as required. Cap 190 provides radiation shielding and may employ a reflective coating on the internal surface which serves to maximize the energy reflected back into the system and used to maintain the heat for the electrochemical reaction.

Figure 10:
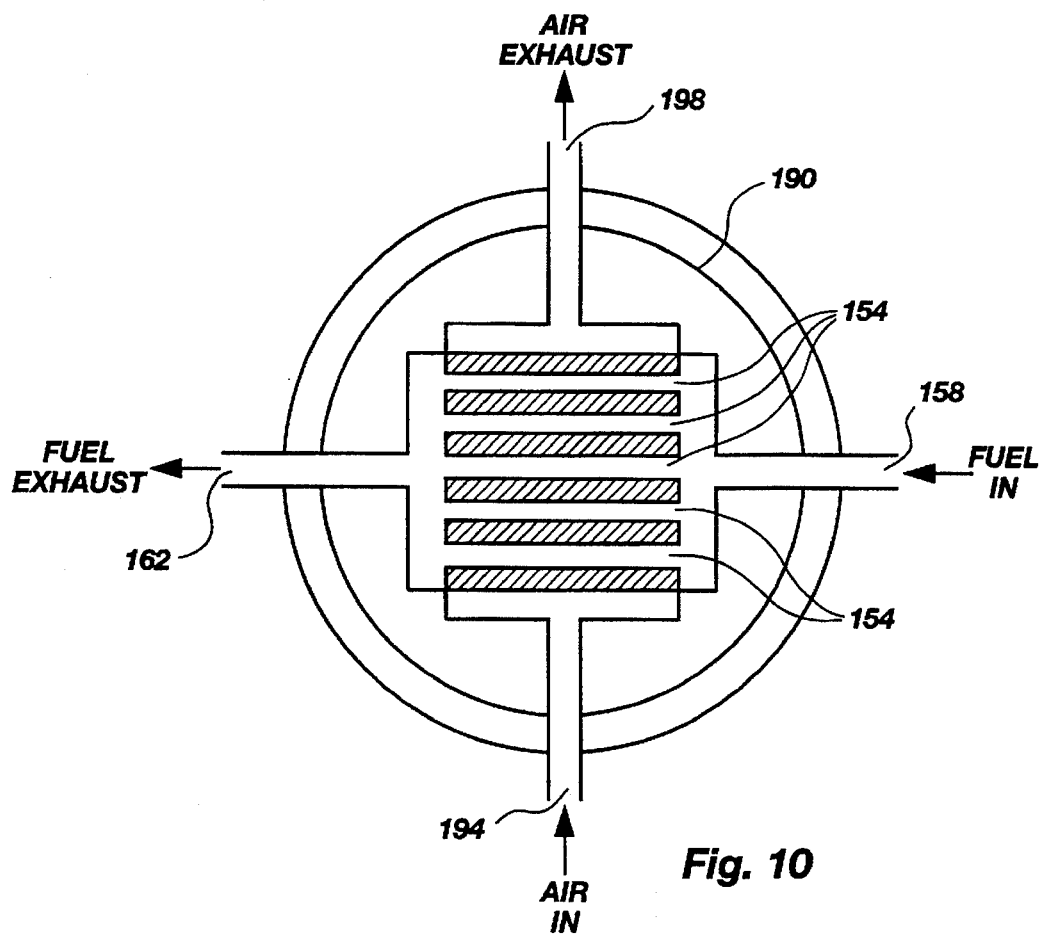
FIG. 10 depicts a top view of the fuel cell system of FIG. 9 which utilizes planar fuel cells

FIG. 10 better illustrates the flow of fuel and air through fuel passageways 154 and air passageways 166. As earlier discussed, fuel enters the system via fuel input port 158 and spent fuel is exhausted through fuel output port 162. As illustrated here, air enters the system through air input port 194 and air exhaust exits via air output port 198.

Figure 11:
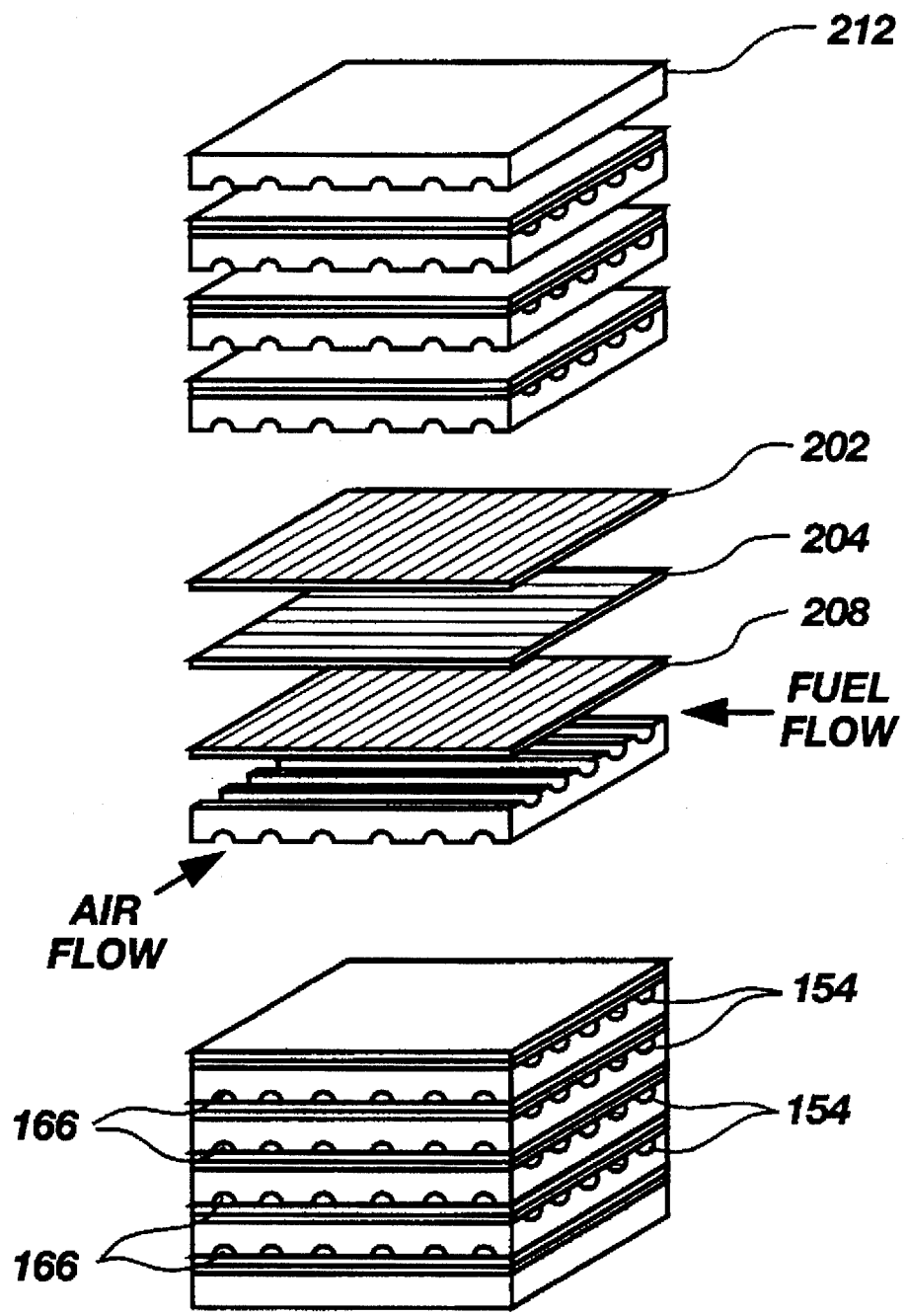
FIG. 11 is a perspective view of the planar fuel cells with one fuel cell being shown in exploded form.

FIG. 11 depicts a number of cells stacked together and shows an exploded view of a single cell. As illustrated, a planar cell utilizes a planar anode 202, a planar electrolyte 204, a planar cathode 208, and a planar interconnect 212. CoNi brazing is typically employed to achieve the desired joining of the cells. Planar anode 202 is typically manufactured of 250 µm Nickel Oxide or Zirconium Oxide. Planar electrolyte 204 is typically manufactured of 3 µm Zirconia (ZrO$_2$). Planar cathode 208 is typically manufactured of 250 µm Lanthanum Manganese Oxide. Finally planar interconnector 212 is typically manufactured of 2500 µm Nickel Aluminum. The Nickel Aluminum of the interconnector provides the catalyst required for automatic reformation of hydro carbon fuels.

As will be appreciated, the geometry of this type of fuel cells is not critical. Geometries other than the tubular geometry and planar geometry depicted in the foregoing embodiments are thus considered to be within the scope of the present invention.

As discussed above, a substantial amount of air must be moved through the power chamber to supply the oxygen for the process. Air flow should be on the order of 10 cc/sec to achieve adequate power output. Simple convective flow is not sufficient to allow the system adequate oxygen.

Several practical problems arise in moving such quantities of air. For example, when the present inventive system is incorporated into a cellular phone, any device utilized to move the air must be quiet and efficient. Devices which create substantially noticeable noise will interfere with the user's ability to carry on a conversation. Thus, it is highly desirable oz reduce the amount of noise associated with air movement as much as possible.

Figure 12:
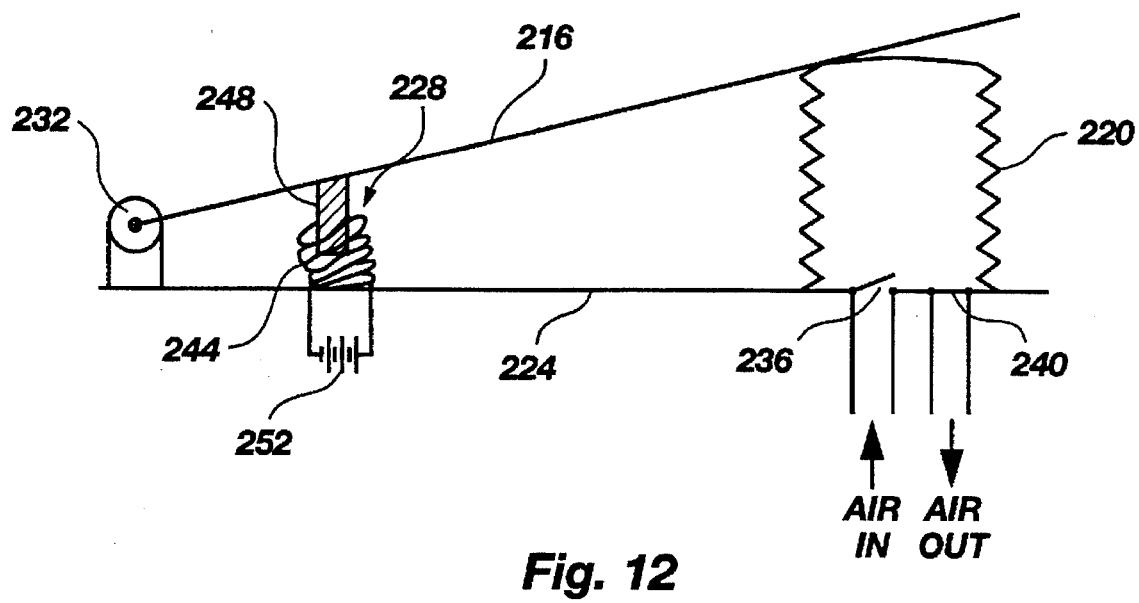
FIG. 12 is a cross sectional view of a bellows air pump utilizing a magnetic actuator.
Figure 13:
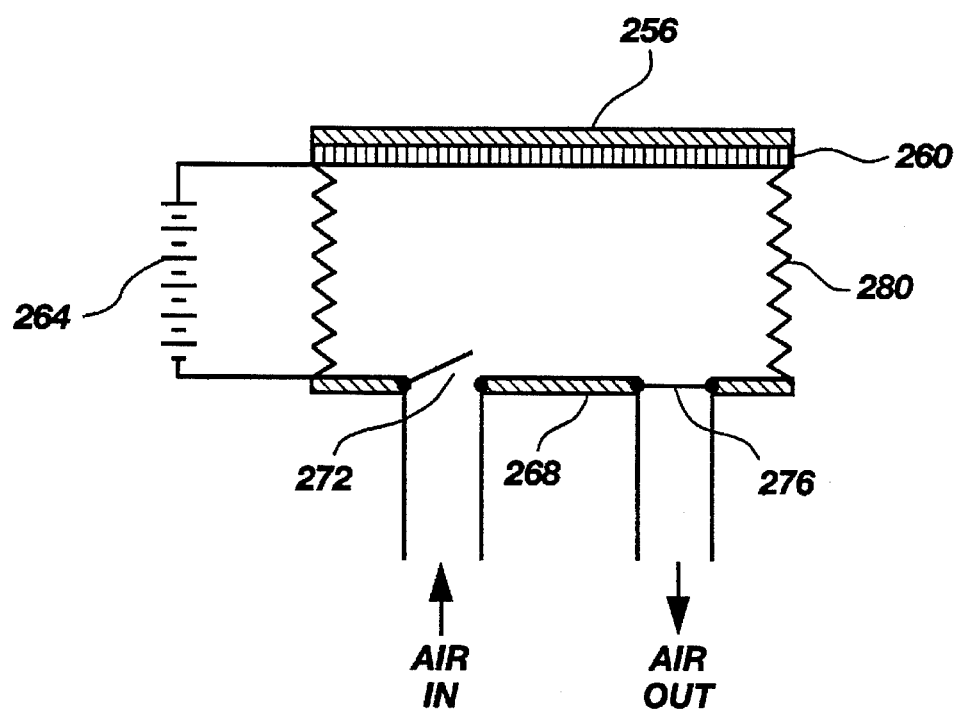
FIG. 13 is a cross sectional view of a bellows air pump employing an electrostatic actuator.

Although a fan could be utilized in some applications, a better approach is to use a bellows device. Bellows are quiet and efficient and well suited to this application. FIGS. 12 and 13 depict various embodiments of bellows which can be utilized. As will be appreciated numerous other bellows configurations can be employed to achieve the same effect.

In FIG. 12, a bellows utilizing a hinged plate 216, bellows 220, base plate 224, and actuator 228. Hinged plate 216 is preferably constructed of a flexible lightweight plastic material or other lightweight material. Hinged plate 216 requires little strength and can therefore be made of a variety of materials. Bellows 220 will preferably be made of a very thin mylar plastic.

The hinged plate pivots, to a limited degree, around hinge 232 as bellows 220 expands and contracts. Bellows 220 expands and contracts as air enters through input valve 236 and exits through output valve 240. Air flow is indicated on the drawing with the air exiting bellows 220 through output valve 240 being returned to the power chamber.

Actuator 228 employs a solenoid coil 244 and solenoid rod 256 which are powered by solenoid power source 252 as required. Actuator 228 is magnetic.

FIG. 13 depicts an electrostatically actuated bellows configuration. A wide flat mylar sheet 256 having aluminized electrically conducting film 260 is connected to a high voltage power source 264. A base sheet 268 having a sheet input valve 272 and a sheet output valve 276 is also connected to high voltage power source 264.

Base sheet 268 and mylar sheet 256 can then be made to attain a charged status. If base sheet 268 and mylar sheet 256 have like charge, either positive or negative, base sheet 268 and mylar sheet 256 will repel each other and force planar bellows 280 to expand thus drawing in air through sheet input valve 272. If base sheet 268 and mylar sheet 256 become oppositely charged base sheet 268 and mylar sheet 256 then attract each other. This attraction forces bellows 280 to contract as the sheets are drawn together and expel air through sheet output valve 276. Air leaving bellows 280 through sheet output valve 276 is returned to the power chamber. As will be appreciated, bellows in other forms and using other activation means could be employed to achieve the same result. For example, a bellows system utilizing a working liquid which turns into a gas at the operating temperatures of the system thereby actuary the bellows as the gas rises. Further, a piezo actuated planar pump could also be utilized to achieve the movement of air required.

Another aspect of the present system which requires management is the production of high heat. Although the fibrous insulation serves to protect surrounding components from damage and the user from injury due to direct contact, there is still the issue of gases which are exhausted from the system at high temperatures. Since the chemical reaction taking place requires maintenance heat it would be highly advantageous to use the exhaust gases to the advantage of the system by recycling the heat back into the system.

Figure 14:
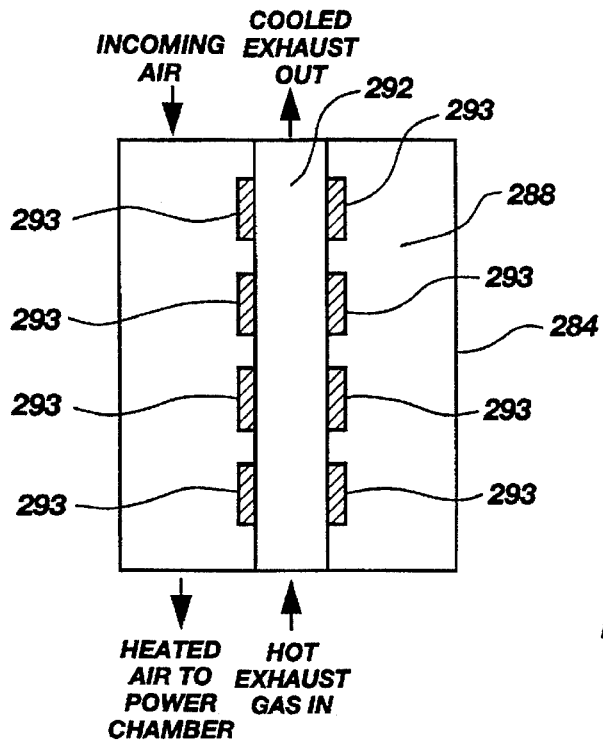
FIG. 14 is a cross sectional view of a cylindrical heat recuperator.

FIG. 14 illustrates one method of heat recuperation which utilizes a cylindrical chimney 284 having an outer duct 288 and an inner duct 292. A thermally conductive material such as metal or ceramic is employed in inner duct 292 such that cool air entering outer duct 288 of cylindrical chimney 284 is heated by hot exhaust gas entering inner duct 292 of cylindrical chimney 284.

This system forms a counter flow heat exchanger. As illustrated, exhaust gases from the power chamber would flow up inner duct 292 while incoming air flowed down outer duct 288. As shown, exhaust gases leaving inner duct 292 of cylindrical chimney 284 have been cooled to a point where they can be safely vented.

Figure 15:
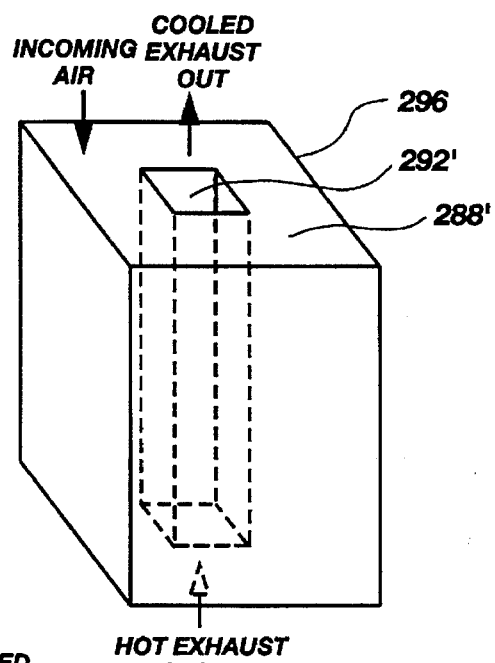
FIG. 15 is a perspective view of a rectangular heat recuperator.

FIG. 15 illustrates an alternative heat recuperation system which is similar to that depicted in FIG. 14. Here a rectangular chimney 296 is constructed of flat plates. A number of materials, such as ceramics or metals, could again be employed as the heat exchanger material.

An outer duct 288' and an inner duct 292' are again employed with the inner duct 292' incorporating the heat exchanger material. Hot exhaust gases flow up inner duct 292' while cool air flows down outer duct 288' thus being heated in the process.

Figure 16:
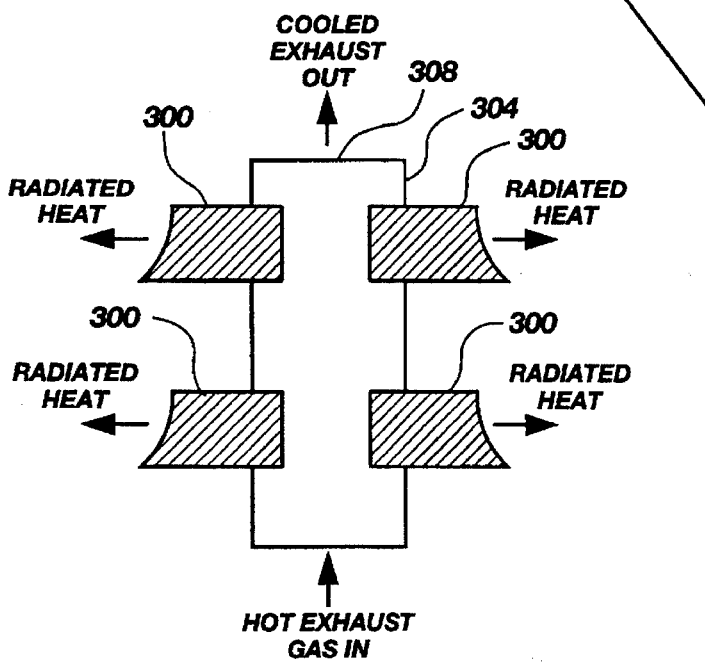
FIG. 16 is a cross sectional view of heat recuperator system which utilizes highly thermally conductive vanes to channel heat from the exhaust gases to other areas of the system.

FIG. 16 depicts another type of heat management system wherein a number of vanes 300 are inserted into chimney 304. Chimney 304 is depicted as rectangular although a variety of geometric configuration could be employed. Exhaust gases travel up shaft 308 of chimney 304. Vanes 300 act to conduct heat away into another region. Vanes 300 are composes of a highly thermally conductive material such as diamond film. Although diamond film can be expensive, the extremely small size of the inventive system allows for practical use of such materials. As will be appreciated, other highly thermally conductive materials could also be employed.

This technique, employing vanes 300, can be employed to conduct heat to an area where incoming air is contained so as to heat it. Similarly, vanes 300 can be employed to conduct heat to an area where fuel is contained so as to heat it prior to its entry to the power chamber.

The $ZrO_2$ electrolyte layer is critical to the feasibility of producing the miniature fuel cell of the present invention. Additionally, the speed of application is an important consideration in terms of manufacturing, particularly mass manufacturing. A process which is long increases costs and may make an otherwise viable product non-competitive.

One of the keys to producing a miniature fuel cell is the production of the key electrolyte layer, as depicted in FIGS. 7, 8 and 11. For best performance, the electrolyte layer must have crystalline density and chemical properties and be a gas tight barrier. In addition, to be commercially successful, the electrolyte layer needs to be capable of manufacture at industrially significant rates with industrially acceptable yields per batch.

Methods of applying $ZrO_2$ typically are slow, but achieving the desired density, or fast, but creating a loosely packed or snow like layer of $ZrO_2$. To be commercially viable, a method of applying the $ZrO_2$ which can be accomplished quickly while attaining the desired density must be employed.

Figure 17:
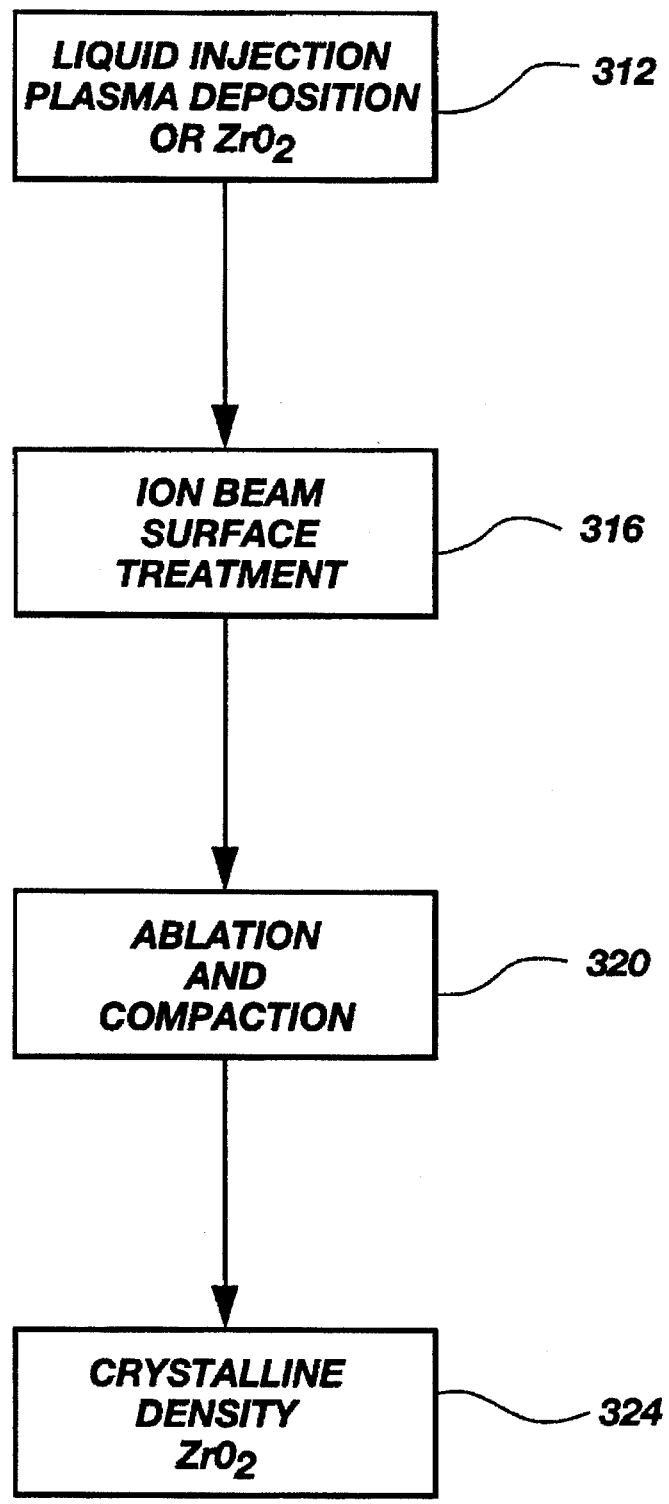
FIG. 17 is a block diagram of the method of applying $ZrO_2$ using a pulsed ion beam to achieve the desired density.

A preferred method of manufacturing the electrolyte layer is depicted in block diagram form in FIG. 17. The $ZrO_2$ is first applied to a substrate using a liquid plasma deposition process as shown at step 312. This process rapidly lays down a layer of $ZrO_2$ and results in a density of $ZrO_2$ which is approximately half of the desired crystalline density.

At step 316 on the $ZrO_2$ applied to the substrate in step 312 is treated with an ion beam. This process is accomplished by utilizing electricity to create a stream of very energetic ions which carry the energy to the surface layer of the target, here the $ZrO_2$ applied to the substrate in step 312. A pulsed ion beam, is used to deposit energy uniformly into just the top 2 to 20 micrometers of the $ZrO_2$. The ion beam is typically operated for less than 200 nano-second long pulses utilizing relatively small energies. This process melts or vaporizes the 2 to 20 micrometer layer. Additional treatment results in the compaction and ablation of step 320.

This process has been used to treat 100 to 200 square centimeters of material per minute when operation in the 100 Kilowatt and above power level. This treatment produces a thin, dense polycrystalline layer of material that is substantially crystalline density and provides a substantially sealed barrier as desired and represented by step 324.

Figure 18A:
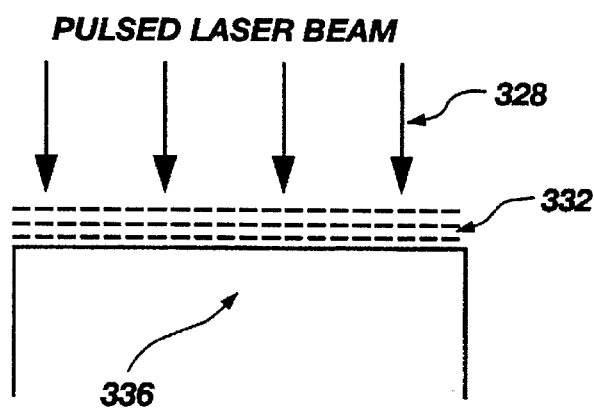
FIG. 18A through 18C depict the steps used in applying $ZrO_2$ to a substrate with a pulsed laser beam.
Figure 18B:
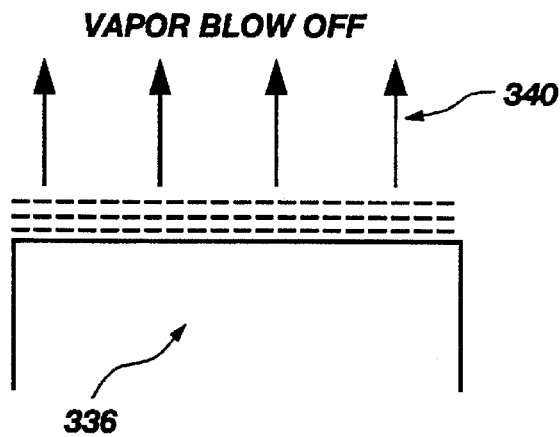
Figure 18C:
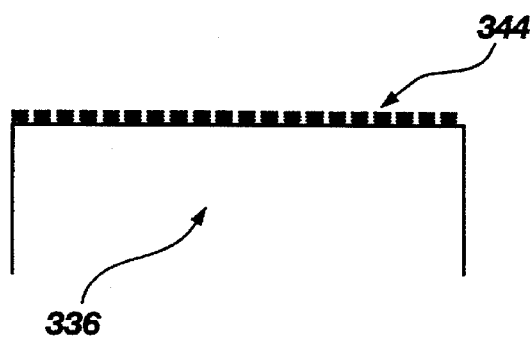

FIGS. 18A, 18B, and 18C depict another method of treating $ZrO_2$ to produce a dense layer. This method utilizes a pulsed laser beam which is applied to loosely packed $ZrO_2$. As shown in FIG. 18A a pulsed laser beam 328 is directed to the non-dense $ZrO_2$ 332 residing on substrate 336. The pulsed laser used to produce pulsed laser beams 328 is typically in the range of 10 MW/cm$_2$ and 1000 MW/cm$_2$. The surface annealing caused by this process results in the dense $ZrO_2$ layer 344 depicted in FIG. 18C.

The achievement of a density of $ZrO_2$ allows for the better conduction of ions and allows for the electric power output or power density. Power density is required to make the miniature solid oxide fuel cell of the present invention a viable option for replacement of batteries in cellular phones, notebook computers, and other portable devices.

In FIG. 18B vapor blow off 340 resulting from the application of the pulse laser beam is depicted.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

We claim:

1. A self-contained power source assembly for use in providing electricity, the power source assembly comprising:

a plurality of fuel cells connected in series, each fuel cell having an anode, a cathode, and electrolyte for producing electricity by oxidation of supplied fuel;

fuel source means for supplying fuel to the fuel cells;

first routing means for directing the flow of fuel about the anode of the fuel cells;

second routing means for directing the flow of air about the cathode of the fuel cells;

air pump means for moving air about the fuel cells adequate to produce a desired power output;

catalyst means for reforming the fuel into the chemical components needed for oxidation; and electric starter means for adding heat to the system thereby to initiate oxidation.

2. A power source assembly for use in providing electricity as defined in claim 1 wherein the fuel cells are cylindrical having an inner surface and an outer surface.

3. A power source assembly for use in providing electricity as defined in claim 2 wherein the anode resides on the outer surface of the cylindrical fuel cell and the cathode resides on the inner surface of the cylindrical fuel cell.

4. A power source assembly for use in providing electricity as defined in claim 2 wherein the anode resides on the inner surface of the cylindrical fuel cell and the cathode resides on the outer surface of the cylindrical fuel cell.

5. A power source assembly for use in providing electricity as defined in claim 1 wherein the fuel cells are planar.

6. A power source assembly as defined in claim 1 wherein the air pump means comprises a bellows pump.

7. A power source assembly as defined in claim 1 wherein the air pump means comprises a bellows pump having a magnetic actuator.

8. A power source assembly as defined in claim 1 wherein the air pump means comprises an electrostatically actuated planar air pump.

9. A power source assembly as defined in claim 3 wherein the catalyst means comprises a Nickel Aluminum Ceramic tube substantially surrounding the cylindrical fuel cells thereby automatically reforming the incoming fuel into the chemical components required for the electrochemical reaction which produces electricity.

10. A power source assembly as defined in claim 4 wherein the catalyst means comprises a Nickel Aluminum Ceramic Element disposed at the inner surface of the cylindrical fuel cells.

11. A power source assembly as defined in claim 1 wherein the starter means comprises a resistance heating element.

12. A power source assembly as defined in claim 11 wherein the resistance heating element comprises a Nichrome wire.

13. A power source assembly as defined in claim 11 wherein the resistance heating element comprises a Tungsten wire.

14. A power source assembly as defined in claim 1 wherein the starter means comprises a burner.

15. A power source assembly as defined in claim 1 wherein the first routing means comprises a container and the second routing means comprises a conduit.

16. A power source assembly as defined in claim 15 wherein the container further comprises a reflective coating disposed interior to the container thereby reflecting energy back into the electrochemical reaction.

17. A power source assembly as defined in claim 15 wherein the container comprises a double walled container thereby containing energy within the container and sustaining the electrochemical reaction.

18. A power source assembly as defined in claim 15 wherein the conduit comprises a straight conduit.

19. A power source assembly as defined in claim 15 wherein the conduit comprises a u-shaped conduit.

20. A power source assembly as defined in claim 1 wherein the first routing means comprises a conduit and the second routing means comprises a container.

21. A power source assembly as defined in claim 20 wherein the container further comprises a reflective coating disposed interior to the container thereby reflecting energy back into the electrochemical reaction.

22. A power source assembly as defined in claim 20 wherein the container comprises a double walled container thereby containing energy within the container and sustaining the electrochemical reaction.

23. A power source assembly as defined in claim 20 wherein the conduit comprises a straight conduit.

24. A power source assembly as defined in claim 20 wherein the conduit comprises a u-shaped conduit.

25. A power source assembly for use in providing electricity, the power source assembly comprising:

a plurality of fuel cells connected in series, each fuel cell having an anode, a cathode, and electrolyte for producing electricity by oxidation of supplied fuel;

fuel source means for supplying fuel to the fuel cells;

first routing means for directing the flow of fuel about the anode of the fuel cells;

second routing means for directing the flow of air about the cathode of the fuel cells;

air pump means for moving air about the fuel cells;

catalyst means for reforming the fuel into the chemical components needed for oxidation;

electric starter means for adding heat to the system thereby to initiate oxidation;

a superinsulator for insulating the high operating heat of the fuel cells from surrounding components; and a recuperator means for recuperating and sending heat back into the fuel cells.

26. A power source assembly for use in providing electricity as defined in claim 25 wherein the fuel cells are cylindrical having an inner surface and an outer surface.

27. A power source assembly for use in providing electricity as defined in claim 26 wherein the anode resides on the outer surface of the cylindrical fuel cell and the cathode resides on the inner surface of the cylindrical fuel cell.

28. A power source assembly for use in providing electricity as defined in claim 26 wherein the anode resides on the inner surface of the cylindrical fuel cell and the cathode resides on the outer surface of the cylindrical fuel cell.

29. A power source assembly for use in providing electricity as defined in claim 25 wherein the fuel cells are planar.

30. A power source assembly as defined in claim 25 wherein the air pump means comprises a bellows pump.

31. A power source assembly as defined in claim 25 wherein the air pump means comprises a bellows pump having a magnetic actuator.

32. A power source assembly as defined in claim 25 wherein the air pump means comprises an electrostatically actuated planar air pump.

33. A power source assembly as defined in claim 25 wherein the starter means comprises a resistance heating element.

34. A power source assembly as defined in claim 33 wherein the resistance heating element comprises a Nichrome wire.

35. A power source assembly as defined in claim 33 wherein the resistance heating element comprises a Tungsten wire.

36. A power source assembly as defined in claim 25 wherein the starter means comprises a burner.

37. A power source assembly as defined in claim 25 wherein the recuperator means comprises a cylindrical chimney having an inner duct and an outer duct, the inner duct having a plurality of thermally conductive elements disposed therein whereby heat is conducted away from hot exhaust gases traveling upward through the inner duct while incoming air is heated as it travels downward through the outer duct.

38. A power source assembly as defined in claim 25 wherein the recuperator means comprises a rectangular chimney having an inner duct and an outer duct, the inner duct having a plurality of thermally conductive elements disposed therein whereby heat is conducted away from hot exhaust gases traveling upward through the inner duct while incoming air is heated as it travels downward through the outer duct.

39. A power source assembly as defined in claim 25 wherein the recuperator means comprises a chimney having a plurality of highly thermally conductive vanes disposed at least partially therethrough, thereby to conduct heat way from hot exhaust gas traveling upward through the chimney.

40. A power source assembly as defined in claim 25 wherein the super insulator comprises space shuttle tile.

41. A power source assembly as defined in claim 25 wherein the first routing means comprises a container and the second routing means comprises a conduit.

42. A power source assembly as defined in claim 41 wherein the container further comprises a reflective coating disposed interior to the container thereby reflecting energy back into the electrochemical reaction.

43. A power source assembly as defined in claim 41 wherein the container comprises a double walled container thereby containing energy within the container and sustaining the electrochemical reaction.

44. A power source assembly as defined in claim 41 wherein the conduit comprises a straight conduit.

45. A power source assembly as defined in claim 41 wherein the conduit comprises a u-shaped conduit.

46. A power source assembly as defined in claim 25 wherein the first routing means comprises a conduit and the second routing means comprises a container.

47. A power source assembly as defined in claim 46 wherein the container further comprises a reflective coating disposed interior to the container thereby reflecting energy back into the electrochemical reaction.

48. A power source assembly as defined in claim 46 wherein the container comprises a double walled container thereby containing energy within the container and sustaining the electrochemical reaction.

49. A power source assembly as defined in claim 46 wherein the conduit comprises a straight conduit.

50. A power source assembly as defined in claim 46 wherein the conduit comprises a u-shaped conduit.

51. A pump source assembly as defined in claim 27 wherein the catalyst means comprises a Nickel Aluminum Ceramic tube substantially surrounding the cylindrical fuel cells.

52. A power source assembly as defined in claim 28 wherein the catalyst means comprises a Nickel Aluminum Ceramic Element disposed at the inner surface of the cylindrical fuel cells thereby automatically reforming the fuel.

* * * * *